(12) United States Patent
Sumant et al.

(10) Patent No.: US 11,440,049 B2
(45) Date of Patent: Sep. 13, 2022

(54) LOW FRICTION COATINGS

(71) Applicant: UCHICAGO ARGONNE, LLC, Chicago, IL (US)

(72) Inventors: Anirudha V. Sumant, Plainfield, IL (US); Venkata Aditya Ayyagari, Darien, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 16/588,637

(22) Filed: Sep. 30, 2019

(65) Prior Publication Data

US 2021/0094067 A1 Apr. 1, 2021

(51) Int. Cl.
| | |
|---|---|
| B05D 5/08 | (2006.01) |
| B05D 7/14 | (2006.01) |
| C09C 3/06 | (2006.01) |
| C09C 1/44 | (2006.01) |
| B05D 1/02 | (2006.01) |

(52) U.S. Cl.
CPC ............ B05D 5/08 (2013.01); B05D 1/02 (2013.01); B05D 5/083 (2013.01); B05D 7/14 (2013.01); C09C 1/44 (2013.01); C09C 3/063 (2013.01); *B05D 2202/10* (2013.01); *B05D 2202/25* (2013.01); *B05D 2252/04* (2013.01); *B05D 2400/00* (2013.01); *B05D 2401/20* (2013.01); *B05D 2506/15* (2013.01)

(58) Field of Classification Search
None
See application file for complete search history.

(56) References Cited

U.S. PATENT DOCUMENTS

| | | | | |
|---|---|---|---|---|
| 3,638,308 | A | * 2/1972 | Fischbein | .......... C08G 18/4825 30/346.53 |
| 3,774,703 | A | * 11/1973 | Sanderson | .............. B26B 21/60 428/600 |
| 5,462,362 | A | 10/1995 | Yuhta et al. | |
| 5,922,418 | A | 7/1999 | Koike et al. | |
| 6,273,973 | B1 | * 8/2001 | Parayil | .................... C21C 5/005 148/542 |
| 2006/0172897 | A1 | 8/2006 | Yamamoto | |
| 2007/0158609 | A1 | 7/2007 | Hong et al. | |

(Continued)

FOREIGN PATENT DOCUMENTS

| | | |
|---|---|---|
| CN | 102627993 A | 8/2012 |
| CN | 106398802 A | 2/2017 |

(Continued)

OTHER PUBLICATIONS

Berman, et al., "Operando tribochemical formation of onion-like-carbon leads to macroscale superlubricity," Nature Communications 9, 1164, 9 pages (2018).

(Continued)

*Primary Examiner* — James M Mellott
(74) *Attorney, Agent, or Firm* — Foley & Lardner LLP

(57) ABSTRACT

A low friction, wear-resistant surface operable at high temperatures and high loads with a low coefficient of friction including boron nitride and graphene-oxide on steel or nanodiamonds and graphene on aluminum. The low friction, wear-resistant surface remains with a coefficient of friction in the superlubric regime at temperatures in between about 200° C. and 970° C.

16 Claims, 6 Drawing Sheets

(56) References Cited

U.S. PATENT DOCUMENTS

| | | | |
|---|---|---|---|
| 2008/0116011 A1 | 5/2008 | Takahama et al. | |
| 2008/0302998 A1 | 12/2008 | Hong et al. | |
| 2009/0033164 A1 | 2/2009 | Khan | |
| 2010/0011826 A1 | 1/2010 | Buehler et al. | |
| 2010/0087346 A1 | 4/2010 | Giesler et al. | |
| 2010/0173134 A1* | 7/2010 | Khokhlov | H01L 51/442 428/174 |
| 2011/0046027 A1 | 2/2011 | Zhamu et al. | |
| 2012/0115761 A1 | 5/2012 | Basu | |
| 2012/0118255 A1 | 5/2012 | Jung et al. | |
| 2012/0122743 A1 | 5/2012 | Ivanov et al. | |
| 2012/0204429 A1* | 8/2012 | Vlachos | B05D 3/042 30/346.5 |
| 2013/0015409 A1 | 1/2013 | Fugetsu | |
| 2013/0115462 A1 | 5/2013 | Mazyar et al. | |
| 2013/0126865 A1 | 5/2013 | Chiang et al. | |
| 2013/0190449 A1 | 7/2013 | Kinloch et al. | |
| 2013/0324447 A1 | 12/2013 | Tsou et al. | |
| 2014/0291819 A1 | 10/2014 | Barth | |
| 2015/0197701 A1 | 7/2015 | Sumant et al. | |
| 2015/0367381 A1 | 12/2015 | Sumant et al. | |
| 2016/0325994 A1 | 11/2016 | Qu et al. | |
| 2018/0223208 A1 | 8/2018 | Sumant et al. | |
| 2018/0229384 A1* | 8/2018 | Chadwick | B26B 21/4068 |
| 2018/0251641 A1* | 9/2018 | Vasileiou | C09D 127/18 |

FOREIGN PATENT DOCUMENTS

| | | |
|---|---|---|
| CN | 108251195 A | 7/2018 |
| RU | 2310777 C2 | 11/2007 |
| WO | WO-2010/125059 A1 | 11/2010 |
| WO | WO-2011/081538 A1 | 7/2011 |
| WO | WO-2012/046069 A1 | 4/2012 |

OTHER PUBLICATIONS

Buckley, "Friction, wear, and lubrication in vacuum," NASA Technical Report No. NASA-SP-277, 190 pages (1971).

Cumings & Zettl, "Low-Friction Nanoscale Linear Bearing Realized from Multiwall Carbon Nanotubes," Science 289(5479), pp. 602-604 (2000).

Dienwiebel, et al., "Superlubricity of Graphite," Physical Review Letters 92(12), 126101, 4 pages (2004).

Fundus & Knock, "Diamond Like Carbon Coatings—Tribological Possibilities and Limitations in Applications on Sintered Silicon Carbide Bearing and Seal Faces," Proceedings of the 14th International Pump Users Symposium, pp. 93-98 (1997).

International Search Report & Written Opinion for PCT/US20013/051121 dated Nov. 14, 2013, 8 pages.

Kim, et al., "Chemical Vapor Deposition-Grown Graphene: The Thinnest Solid Lubricant," ACS Nano 5(6), pp. 5107-5114 (2011).

Kim, et al., "Chemical Vapor Deposition-Grown Graphene: The Thinnest Solid Lubricant," ACS Nano 5, pp. 5107-5114 (2014).

Lee, et al., "Frictional Characteristics of Atomically Thin Sheets," Science 328(5974), pp. 76-80, (2010).

Liu, Z., et al., "Observation of Microscale Superlubricity in Graphite", Physical Review Letters, May 18, 2012, 108:205503-1-205503-5.

Novoselov, et al., "Electric Field Effect in Atomically Thin Carbon Films," Science 306(5696), pp. 666-669 (2004).

Singhbabu, et al., "Efficient anti-corrosive coating of cold-rolled steel in a seawater environment using an oil-based graphene oxide ink," Nanoscale 7(17), pp. 8035-8047 (2015).

Stankovich, et al., "Synthesis of graphene-based nanosheets via chemical reduction of exfoliated graphite oxide," Carbon 45(7), pp. 1558-1565 (2007).

Sumant, et al., "Ultrananocrystalline Diamond Film as a Wear-Resistant and Protective Coating for Mechanical Seal Applications," Tribology Transactions 48(1), pp. 24-31 (2005).

Yu, et al., "Graphene segregated on Ni surfaces and transferred to insulators," Applied Physics Letters 93, 113103, 4 pages (2008).

Babuska, et al., "Understanding Friction in MoS2: Part 1: Stress, Time and Temperature," 63rd AVS Symposium, SAND2017-51290, 15 pages (2017).

Berman, et al., "Macroscale superlubricity enabled by graphene nanoscroll formation," Science 348(6239), pp. 1118-1122 (2015).

Hare & Burris, "The Effects of Environmental Water and Oxygen on the Temperature-Dependent Friction of Sputtered Molybdenum Disulfide," Tribology Letters 52(3), pp. 485-493 (2013).

Kimura, et al., "Boron nitride as a lubricant additive," Wear 232(2), pp. 199-206 (1999).

Podgornik, et al., "Tribological behaviour and lubrication performance of hexagonal boron nitride (h-BN) as a replacement for graphite in aluminium forming," Tibology International 81, pp. 267-275 (2015).

Wu, et al., "Experimental analysis of tribological properties of lubricating oils with nanoparticle additives," Wear 262(7-8), pp. 819-825 (2007).

Hamilton, et al., "A Possible Link Between Macroscopic Wear and Temperature Dependent Friction Behaviors of MoS2 Coatings," Tribology Letters 32, pp. 91-98 (2008).

Singh, et al., "Fatigue resistant carbon coatings for rolling/sliding contacts," Tribology International 98, pp. 172-178 (2016).

Wu, et al., "Tribological behavior of WC/DLC/WS2 nanocomposite coatings," Surface and Coatings Technology 188-189, pp. 605-611 (2004).

\* cited by examiner

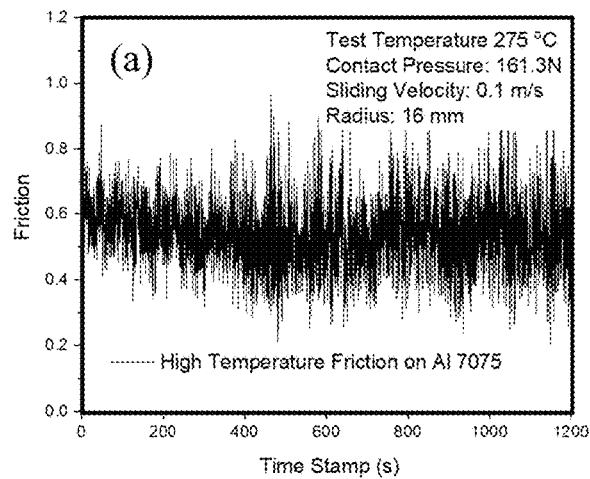
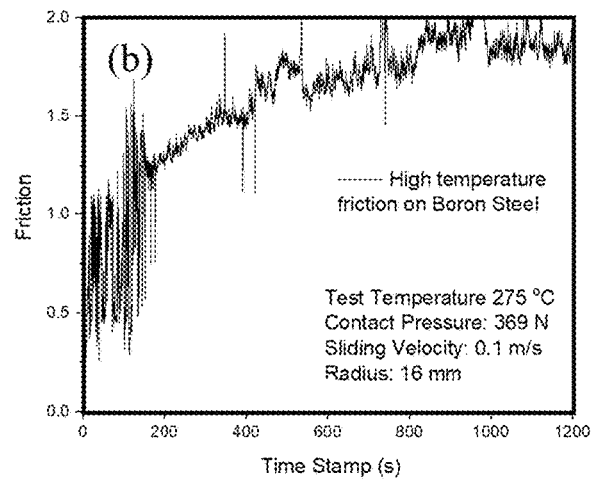
FIG. 4A
FIG. 4B
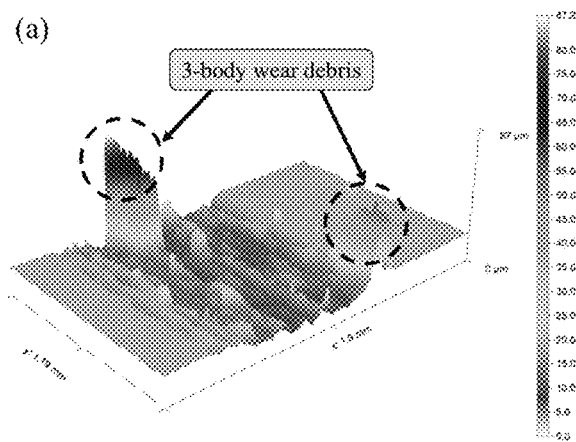
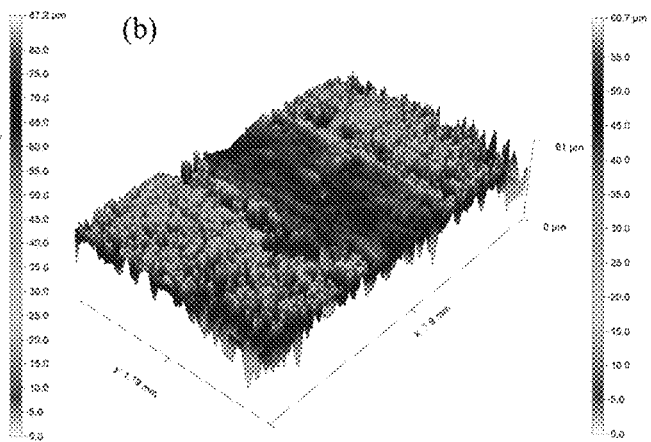
FIG. 5A
FIG. 5B

LOW FRICTION COATINGS

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

BACKGROUND

Understanding and controlling the root causes of friction have long been a tireless pursuit of mankind, mainly because friction impacts our safety, mobility, and environment in so many ways. Accordingly, those scientists who study friction across many scales and engineers who design, manufacture, and operate moving mechanical assemblies ("MMAs"), like motored vehicles, have all aimed at drastically reducing or even totally vanishing friction or achieving superlubricity at engineering scales. The low friction regime is attractive because it would provide the high levels of savings in energy, environment, and money. Despite the development and use of many kinds of solid and liquid lubricants in recent years, superlubricity is seldom achieved at macro or engineering scales. Friction coefficients of above 0.01 to 0.1 are considered low friction and above that transitions to high friction. Generally, friction coefficients of less than 0.01 are considered superlow, and hence fall in the superlubric regime. Such levels of friction coefficients are typical of those surfaces that are either aero- or hydro-dynamically separated or magnetically levitated where little or no solid-to-solid contact takes place. Under sliding regimes where direct metal-to-metal contacts prevail and high contact pressures are present, achieving superlubric friction coefficients (i.e., less than 0.01) is difficult due to the concurrent and often very complex physical, chemical, and mechanical interactions taking place at sliding surfaces.

In addition, some applications that would require or benefit from low friction also have non-ideal environments for low friction. For example, hot stamping operation has rapidly expanded in the sheet metal manufacturing domain for high throughput manufacturing. Some estimates suggest that as high as 44% of entire car chassis is manufactured of hot stamped products. Hot stamping calls for application of forging loads beyond the yield strength of the sheet material. State of the art technology heavily relies on water soluble lubricants, sheet metal pre-coated with an Al—Si alloy and lubricant oils on lowering friction to enable high degree of formability and prevent failures during forming operations. However challenges with such lubricants are post-operation cleaning steps to make the stamped parts paint-ready, recycling and disposal of spent lubricants, and bulk application of lubricant despite lubricant being necessitated only at a few high stress regions.

SUMMARY

One embodiment relates to a method of forming a low friction, wear-resistant surface comprising: preparing graphene by chemical exfoliation of polycrystalline graphite or highly-oriented pyrolytic graphite; suspending graphene-oxide in a solvent to form a mixture of at least 500 mg/L; adding at least 500 mg/L of boron nitride to the mixture; sonicating the mixture to form a homogenous mixture; and disposing the homogeneous mixture by: spraying the homogeneous mixture on a substrate via a process of air-spray coating, wherein the substrate has a temperature at least 110° C., forming a wet film on the substrate, and evaporating the solvent component to form a dry coating layer.

Another embodiment relates to a method of forming a low friction, wear-resistant surface comprising: preparing a functionalizer solution comprising a polymer; forming a solid lubricant mixture; sonicating the solution to form a homogenous mixture; adding polymer functionalizer solution to the homogenous suspension forming a liquid spray mixture; and disposing the liquid spray mixture by: spraying the liquid spray mixture on a substrate via a process of air-spray coating, forming a wet film on the substrate, and evaporating the solvent component to form a dry coating layer; wherein the dry coating layer comprises the polymer and the solid lubricant.

Another embodiment relates to a method of forming a low friction, wear-resistant surface comprising: suspending nanodiamonds having an average particle size of size of 5-10 nm in water to form a suspension of at least 5 mg/L; sonicating the solution to form a homogenous suspension; and disposing the homogeneous suspension by: spraying the homogeneous suspension on a substrate via a process of air-spray coating, wherein the substrate has a temperature at about 275° C., forming a wet film on the substrate, and evaporating the solvent component to form a dry coating layer.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 4A-4B show baseline test showing friction between Al 7075 disc against 52100 counterface ball (FIG. 4A) and Boron Steel disc against 52100 counterface ball with no lubricant on the surface (FIG. 4B).

FIGS. 5A-5B are surface topographies after wear testing of samples with no coating (FIG. 5A) and BN-GO (FIG. 5B).

DETAILED DESCRIPTION

Figure 1:
FIG. 1 is a schematic depiction of a method of forming a low friction, wear-resistant surface.

Following below are more detailed descriptions of various concepts related to, and embodiments of, inventive low friction and wear-resistant graphene containing surfaces. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Superlubricity may be defined as a regime of motion in which friction vanishes or nearly vanishes, such as a COF of less than about 0.01. The superlubric friction is measured by sliding the low friction, wear-resistant surface using a ball-on-disc configuration of wear testing, under unidirectional sliding.

Generally speaking, the various embodiments described herein include a low friction or super low friction, wear-resistant surface including 2-D materials such as boron nitride ("BN"), ND, graphene, tungsten sulfide ($WS_2$), molybdenum tellurium ($MoTe_2$) and/or graphene-oxide ("GO"). In one embodiment, a combination of BN and GO is utilized as a spray coating on a steel surface. In another embodiment, graphene and nanodiamonds are utilized on an aluminum surface. In both cases, the resultant surface may exhibit sub-superlubricity in high temperatures (e.g., 100° C. to a maximum of 975° C.) and under high loads (e.g., above 200 MPa to a maximum of 1 GPa contact pressures).

Embodiments described herein may provide several advantages over conventional materials that demonstrate superlubricity including, for example: 1) providing low friction (i.e., between 0.01-0.1 coefficient of friction) at high temperatures ranging from about 200° C. to about 400° C.; 2) low friction at 275° C., 480° C. and at 970° C. under ambient oxygen and humidity conditions with reasonable reproducibility; 3) a simple-to-use and scalable process; 4) improvement in the adhesion of the coating and durability is achieved with additives; 5) lowering wear/friction related issues at high temperature where limited number of oil-based lubricants are currently being used; and 6) the solid lubricant coatings could be simply washed out with water thus significantly reducing the post-processing requirements to remove lubricants after stamping.

Boron Nitride and Graphene Oxide on Steel.

One embodiment relates to BN-GO solution spray coated onto a hot (110-350° C.) steel substrate. While tribological behavior and lubrication performance of boron nitride powder in its bulk form have been evaluated as a substitution to graphite in Al forging process, they have not been combined as a spray coated solution and coated onto hot steel. In prior work, the bulk boron nitride was used an additive in NLGI class-2 lubrication grease, made from lithium 12-hydroxystearate thickener, high-quality mineral oil, at a high concentration of 10 and for use at 20° C. with a relative humidity of 40%. Similarly, Boron nitride's efficiency as a lubricant additive was explored by adding the solid particles to paraffinic mineral oil. Here too the tests were carried out at ambient conditions and the temperature of the oil maintained at 40° C.

The process may be carried out at atmospheric pressures and temperatures, that is exposed to oxygen (in the atmosphere) and at a temperature of about 20-22° C., which is contrary to the prior art requiring a dry, inert or nitrogen environment. The disposing of the homogeneous solution on the substrate may be achieved by any suitable process, such as a spray casting or a solution processed method.

FIG. 1 is a schematic flow diagram of an example method 100 for forming a low friction, wear-resistant surface including $MoS_2$ and GO. In this method 100, a suspension of BN and GO is formed. The BN-GO solution may be prepared in different concentrations are then mixed together. The BN and GO are in a range of ratios in between about 1:1 and disposing the homogeneous suspension over a substrate heated to within the range of 110° C. to 350° C., such as 275° C. BN may be added to a container (e.g., a vial) at 102, such as in a microcrystalline flake form.

The BN may be added to a solution of GO or BN, and GO solids (e.g., micro or nanocrystalline flakes) are added to a container and a solvent is added, such as water or an alcohol, to form a suspension. The GO solution may be obtained by exfoliating graphene and disposing the resulting graphene flakes in a liquid. The graphene may be exfoliated by any appropriate chemical or mechanical exfoliation process, such as chemical exfoliation of polycrystalline graphite or highly oriented pyrolytic graphite in the case of graphene. The GO solution may be aqueous with an oil-free solvent. In some embodiments, the GO will be suspended in water. An oil-free solution is more environmentally friendly, devoid of oil related hazards, and easy to strip after usage. In some embodiments, the coating may be easily removed by immersing the coated substrate into deionized water and sonicating for 3 minutes or instantaneously by pressure jet washing. In some embodiments, the GO is suspended in a solvent to form a solution of at least 1 g/L. Alternatively, a solvent (e.g., a solvent in which the GO is soluble) may be added; in one non-limiting example, water may be added.

The method 100 for forming the low friction, wear-resistant surface includes sonicating at the BN-GO solution in the container to form a homogeneous suspension. Sonication may be done in any device capable of applying sound energy to agitate particles in a sample, for example, but not limited to, an ultrasonic bath or an ultrasonic probe. In one embodiment, the sonication is at a frequency of up to 45 Hz, such as 40-45 Hz.

At 110, the BN-GO solution may be introduced onto the surface of the substrate via a process of air spray-coating by spraying a 2-D materials-containing solution (with a solvent such as water) over the substrate and then evaporating the solvent. The spray coating process differs from physical vapor deposition or similar techniques (e.g., chemical vapor deposition or atomic layer deposition) as it does not require a vacuum and utilizes a carrier liquid to deliver the solid materials, and the carrier liquid can evaporate without physically altering/changing/damaging MoS$_2$ and GO can be used. Such deposition differs from those remaining in solution (such as graphene suspended in oil) or those applied chemically. For example, those materials in solution are, obviously, in solution and not bound to the substrate surface (e.g., flowable oil with suspended particles). In contrast, solid materials that have been deposited as by spraying will not be in solution, rather such materials will be controlled by Van der Waals forces to attach the materials to the substrate. Further, there is also a structural difference between such materials and those formed as a solid on the surface of the substrate by chemical vapor deposition, atomic layer deposition, or the like. In such instances, the material is reacted (covalently bonded) with or chemisorbed to the substrate rather than merely held by Van der Waals forces. The thickness is controlled by altering the samples' exposure time to the spray. Pressure/flowrate can also effectively be used to change the amount of soli-bearing liquid carrier impinged on to the surface during the spraying process. Subsequent coats must be applied after the initial layers have completely dried and have adhered to the substrate firmly. The thickness of the coating "required" to produce low-friction properties depends on the test load. It will be appreciate that lower test loads transition into low-friction regime easily even with a thin coating, whereas thicker coatings are required for higher loads and for longer sliding distances. Further, for more than mono layer, the additional layers are also bound, whereas the liquid processed materials experience weaker Van der Waals forces, enabling the sloughing of outer layers and the improved lubricity.

In some embodiments, the method 100 of forming the low friction, wear-resistant surface includes evaporating the solvent component and encapsulation. This coating process is scalable to larger surfaces and is not restricted to flat surfaces. A large scale application of such may be to utilize a scanning spray nozzle to cover a large area with the graphene in suspension and then vaporize the solvent. In some embodiments, the substrate surface is required to have some anchoring elements, such as due to surface roughness In some embodiments, a rough surfa (Ra~0.2-0.4 um) provides sufficient anchoring points. In case of extremely smooth substrates, the surfaces of the substrate are treated to make them amenable to the deposition techniques. Such treatment may include ozone treatment and/or doping with binders that make bonds between the steel and the initial layers and higher substrates (up to 400° C.) temperatures.

The substrate may be heated to at least 110° C. (e.g., to 275° C.) at 112. Encapsulation occur as the carried media evaporates. In some embodiments, the substrate may be a steel surface, such as, but not limited to, ceramic substrates, self-mated hardened stainless steel, ferritic stainless steel, austenitic stainless steel, martensitic stainless steel, duplex stainless steel, and precipitation hardened stainless steel. In some embodiments, the substrate can comprise at least a portion of a metal working die, a wind turbine, a polymer injection molding die, a piston, a piston ring, a piston sleeve, a ball and roller bearing element, an oil-free air compressor, a gas compressor, a gas seal, a sliding rail guide, or a heavy load bearing wheel guide.

Nanodiamonds on Aluminum.

Another embodiment relates to graphene and nanodiamonds spray coated onto a hot (e.g., 275° C.) aluminum substrate. While the nanoparticles of diamond have been used with liquid lubricants (e.g., added to SAE grade oils in <0.1% proportion and tested at 160° C.), nanodiamond solid lubricant at more elevated temperatures have not been reported. These reports present the wear and friction analysis when the nanomaterials are used only as additives into lubricating oils and at much lower temperatures.

In one embodiment, nanodiamond particles ("ultrafine," having an average particle size of 5-10 nm) are dispersed in water or alcohol. In one embodiment, the process uses ultrasonication for dispersion of the nanoparticles, such as with a frequency of sonication is up to 45 Hz, for between 2-10 min. The ultrafine nanodiamonds form a dispersion with 0.5-10 mg/L of diamond, such as 5 mg/L.

The nanodiamond and graphene suspension may be introduced onto the surface of the substrate via a process of air spray-coating by spraying the suspension (with a solvent such as water) over the substrate and then evaporating the solvent. Such deposition differs from those remaining in solution (e.g., graphene suspended in oil) or those applied chemically. For example, those materials in solution are, obviously, in solution and not bound to the substrate surface (e.g., flowable oil with suspended particles). In contrast, solid materials that have been deposited as by spraying will not be in solution, rather such materials will be controlled by Van der Waals forces to attach the materials to the substrate. Further, there is also a structural difference between such materials and those formed as a solid on the surface of the substrate by chemical vapor deposition, atomic layer deposition, or the like. In such instances, the material is reacted (covalently bonded) with or chemisorbed to the substrate rather than merely held by Van der Waals forces. The coating has a thickness range between to 0.5-2 mm. Further, for more than mono layer, the additional layers are also bound, whereas the liquid processed materials experience weaker Van der Waals forces, enabling the sloughing of outer layers and the improved lubricity.

This coating process is scalable to larger surfaces and is not restricted to flat surfaces. A large scale application of such may be to utilize a scanning spray nozzle to cover a large area with the graphene in suspension and then vaporize the solvent. The lubricant was observed to perform well up to the range of 450-975 nm surface roughness.

The substrate may be heated, to a minimum of 110° C. (e.g., to 275° C.) at 112. The lower temperature limit is dependent on the boiling point of the carrier liquid. In some embodiments, the substrate may be a metal surface such as but not limited to aluminum. Al has a thin electrolytic coating of Al—Si coating that is in place for corrosion resistance.

Polymer Functionalizer Agent.

In some embodiments, a 2D material and/or nanodiamond material forms a lubricant that includes a functionalizing agent (e.g., PDA, polytetrafluoroethylene ("PTFE"), and/or Polyether ether ketone ("PEEK")) to improve the adhesion of the coating and durability. It is believed that the functionalizing agent is working as a binding agent between the nanoparticles and the substrate surface.

Adhesiveness was improved by adding a functionalizer to the lubricant. In one embodiment, the process includes forming a polymer solution. For example, first, 0.2 mg of PDA powder was mixed with 9 ml of Ethanol and 2 mL of deionized ("DI") water. The pH was adjusted to 8.3 to produce a starting polymer solution. This PDA powder containing solution was tumbled for 48 h to produce polymerization. Once polymerized, such as at the 48 h mark, the solution is considered as stock polymer solution for further dilutions and addition with a lubricating material.

In one embodiment, 5 mL of the stock solution was mixed with 5 mL of DI water and pH was adjusted back to 8.3 if it changed from starting solution, producing the lubricant base. 2 mL of lubricant base was mixed 1:1 with a lubricant suspension, such as BN-GO, ND, MoS$_2$, graphene, or WS$_2$, as described above.

It should be appreciated that the amounts may be scaled to produce a batch of desirable quantity.

EXPERIMENTAL EXAMPLES

A series of experiments were undertaken to test various embodiments. One set of experiments reviewed the performance of embodiments relating to BN-GO material or ND in water sprayed on to a hot substrate. A second set of experiments considered embodiments utilizing a 2-D material or ND with PDA as a funtionalizer and performance under a twisting compression test. The tribosystems studied, test parameters, and resulting friction values have been summarized in Table 1.

TABLE 1

Summary of tribosystems studied, test parameters, and observed friction values

| Lubricant | Concentration | Substrate | Test method | Test Temp | Test Speed | Test Load | Steady State Friction Observed |
|---|---|---|---|---|---|---|---|
| BN – GO in water | 500 mg/L of BN + GO | Boron Steel | Pin on disc | 275° C. | 0.1 m/s | 0.5N | 0.1 ± 0.035 |
| ND in water | 5 mg/L | Al 7075 | Pin on disc | 275° C. | 0.1 m/s | 0.3N | 0.25 ± 0.1 |
| ND + PDA | 1:1 | Al 7075 | TCT | 230° C. | 50 mm/s | 7 MPa | 0.05 |
| MoS$_2$ + PDA | 1:1 | Al 7075 | TCT | 230° C. | 50 mm/s | 7 MPa | 0.025-0.075 |
| Graphene + PDA | 1:1 | Al 7075 | TCT | 480° C. | 50 mm/s | 7 MPa | 0.05 ± 0.01 |
| WS$_2$ + PDA | 1:1 | Boron Steel | TCT | 790° C. | 50 mm/s | 7 MPa | 0.05 |

Examples 2-D with GO and ND in Water

Boron steel and high strength Al 7075 alloys were used as test blanks to demonstrate the efficacy of the lubricant since these two alloys are extensively used in the automobile industry. The respective substrate material is noted for each experiment.

Preparation of a Low Friction, Wear-Resistant Surface.

A first lubricant was synthesized by mixing 50 mg of GO with 50 mg of BN suspended in water. The suspension was raised up to 40 mL. The lubricant was spray coated on to high strength boron steel specimens maintained at 275° C.

A second lubricant was created for use on Al 7075 substrate. Ultrafine nanodiamond particles having positive zeta potential was dispersed into water to a have concentration of 5 mg/L and sprayed on to the Al substrate heated to 275° C. The coatings were tested using a high temperature tribometer under a normal load applied using a spherical indenter, while the sample was heated and maintained at 275° C. A schematic illustrating the coating procedure is shown in FIG. 1.

Friction Evaluation.

Friction evaluation was carried using a high temperature tribometer in a ball-on-disc configuration. Boron steel and Al 7075 were used as discs, whereas 52100 ball having 10 mm diameter was used as the counterface ball. The disc was actively heated while the ball remained suspended in the furnace, having approximately the same temperature as the disc until contact was made.

Figures 2A, 2B:
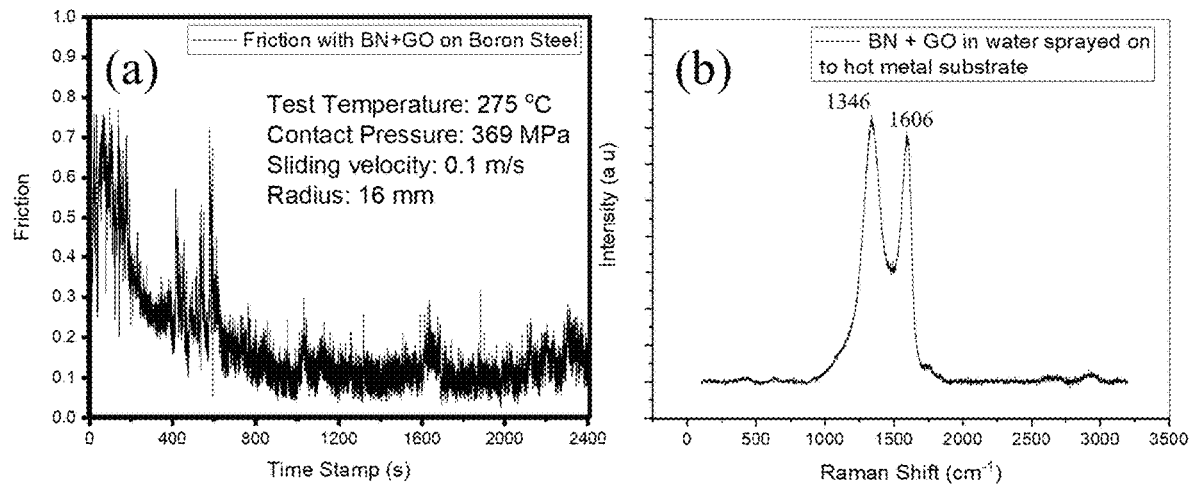
FIG. 2A is a frictogram showing friction evolution on boron steel substrate with boron nitride-doped graphene oxide ("BN-GO") coating on the surface, tested at 275° C., showing a steady state friction of 0.1.
FIG. 2B shows a Raman spectra indicating a BN-GO signature from the wear track.

The friction measured on the Boron steel substrate with BN-GO lubricant is shown in FIG. 2A. The steady state friction recorded after the initial run-in period is 0.1±0.035. The Raman spectrum of the lubricant coating recorded from the wear track is shown in FIG. 2B. The Raman spectra shows a strong GO signature with faint BN peak, overlapping with the GO peak. The relatively weak signal from the BN is due to the small volume fraction compared to the GO. The signature from the as-deposited coating resembled closely to the signature wear track indicating that the coating did not degrade under stress and temperature.

Figures 3A, 3B:
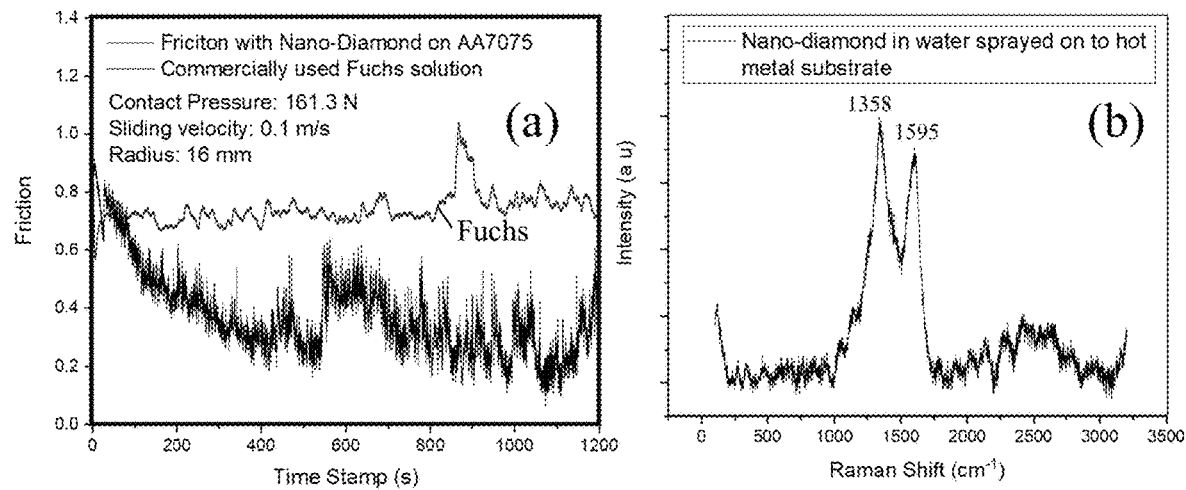
FIG. 3A is a frictogram showing friction evolution on Al 7075 substrate with nanodiamond ("ND") coating on the surface, tested at 275° C., showing a steady state friction of 0.25. The friction observed when coated with commercial Fuchs solution is also shown. The average friction with Fuchs solution is ~0.7.
FIG. 3B shows a Raman spectra showing ND signature from the wear track.

Friction measured on the Al 7075 substrate with ND is shown in FIG. 3A, and the Raman spectrum is shown in FIG. 3B. The steady state friction measured was 0.25±0.1 following the initial run-in period. ND signature remained relatively unchanged before and after the test. When friction was tested with a commercially used Fuchs solution, the friction was recorded at 0.7, which is significantly higher than ND.

Comparing the friction values recorded with the presence of solid lubricant against respective bare substrates, the Al 7075 with ND tribosystem showed a 58.3% decrease (from 0.6 to 0.25) whereas the Boron steel BN-GO tribosystem showed a 94% decrease (from 1.65 to 0.1), which is unprecedented relative to the state of the art. In addition to the significant reduction in friction values, a significant improvement in the wear-resistance imparted by the coatings is also seen. FIGS. 5A-5B show the 3-D interferogram images of the surfaces after wear testing. FIG. 5A shows the wear track on bare steel sample, while FIG. 5B shows with BN+GO with a faint wear having a volume of 465×10$^{-12}$ m$^3$. The wear volume on bare steel was 613×10$^{-12}$ m$^3$, indicating that the lubricant reduced the wear volume loss by 24.14%.

Figures 6A, 6B:
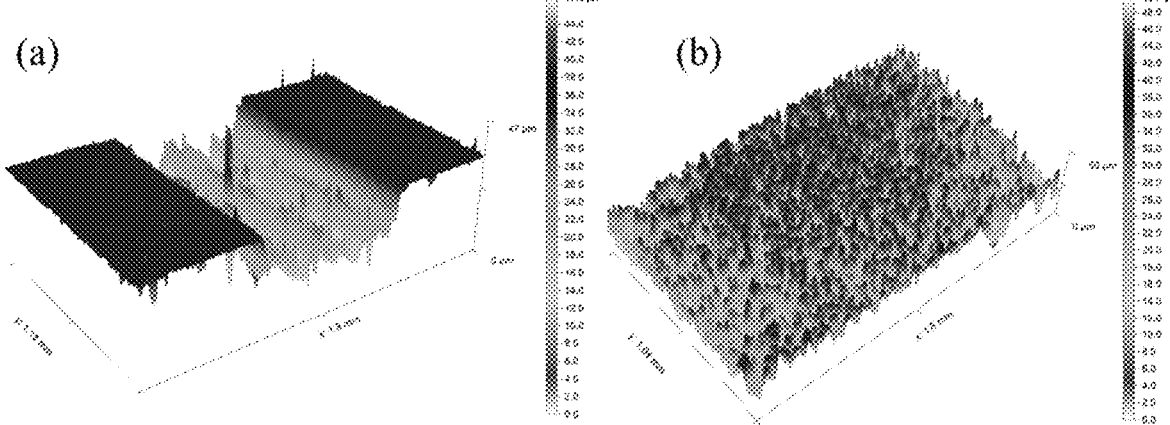
FIG. 6A shows wear on Al bare substrate showing a deep wear scar.
FIG. 6B shows no measurable wear on ND coated Al.

FIGS. 6A-6B show the sample topographies on Al alloys. FIG. 6A shows the wear track on bare Al with no lubricant, and FIG. 6B shows the wear on the surface coated with ND. The wear on the bare Aluminum was 1115×10$^{-12}$ m$^3$, whereas no calculable wear was noticed on the ND coated samples. Following the tests, the solid lubricants could be easily removed by washing under a stream of tap water for 30 seconds. No remnants of solid lubricants were observed to adhere on to the respective metal surfaces.

Example 2-D Materials and ND with Functionalizer

Following the pin-on disc tests, twist compression tests were carried to closely simulate the actual forging operating.

The lubricants formulations were designed to achieve higher degree of adhesiveness and further lower friction values. Addition of PDA is made to improve the adhesion of the nano particles to the substrate in the case of the more severe loading condition in twist compression test.

Adhesiveness of the ND was improved by adding PDA to the lubricant. Polymer processing steps consisted of the following steps. First, 0.2 mg of PDA powder was mixed with 9 ml of Ethanol and 2 mL of DI water. The pH was adjusted to 8.3 to produce a starting solution. This PDA powder containing solution was tumbled for 48 h to produce polymerization. At the 48 h mark, the solution is considered as stock solution for further dilutions.

Figure 7:
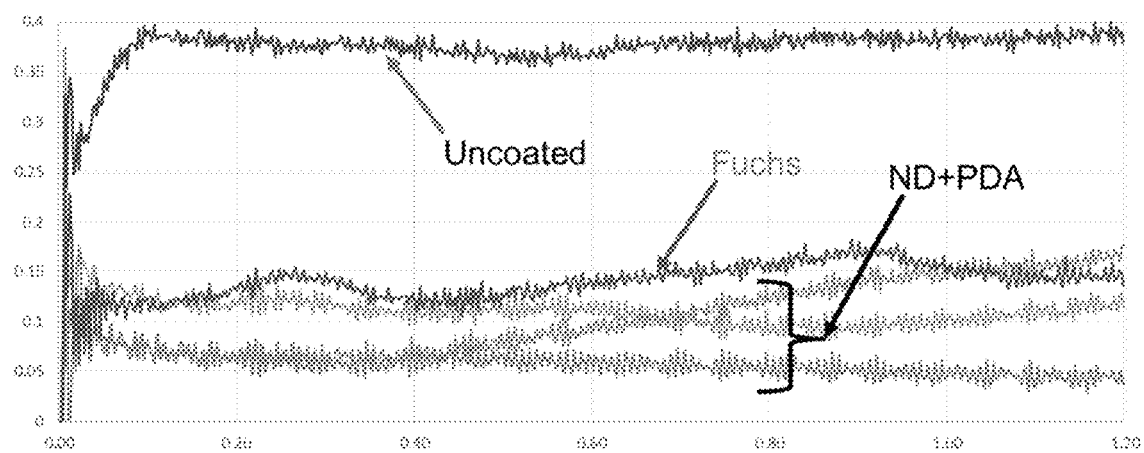
FIG. 7 is a graph of friction recorded at 480° C. against Al 7050 substrate with the ND+polydopamine ("PDA") lubricant using twist compression test.

Next, 5 mL of the stock solution was mixed with 5 mL of DI water and pH was adjusted back to 8.3 if it changed from starting solution. This solution is called the lubricant base. 2 mL of lubricant base was mixed with 2 mL of water-based ND (positive Zeta potential, 5 mg/L) to produce the lubricant that was applied on to the twist compression cups using air spraying. Similarly, 2 mL of lubricant base was mixed with 2 mL of 500 mg/L graphene to form a graphene base solution and also with 2 mL of $MoS_2$ solution to form a $MoS_2$ base solution, producing a library of comparison lubricants which was applied using air brush. The friction recorded with these lubricants tested against Al7050 at 230° C. is shown in FIGS. 7, 8A, and 8B.

Figure 8A:
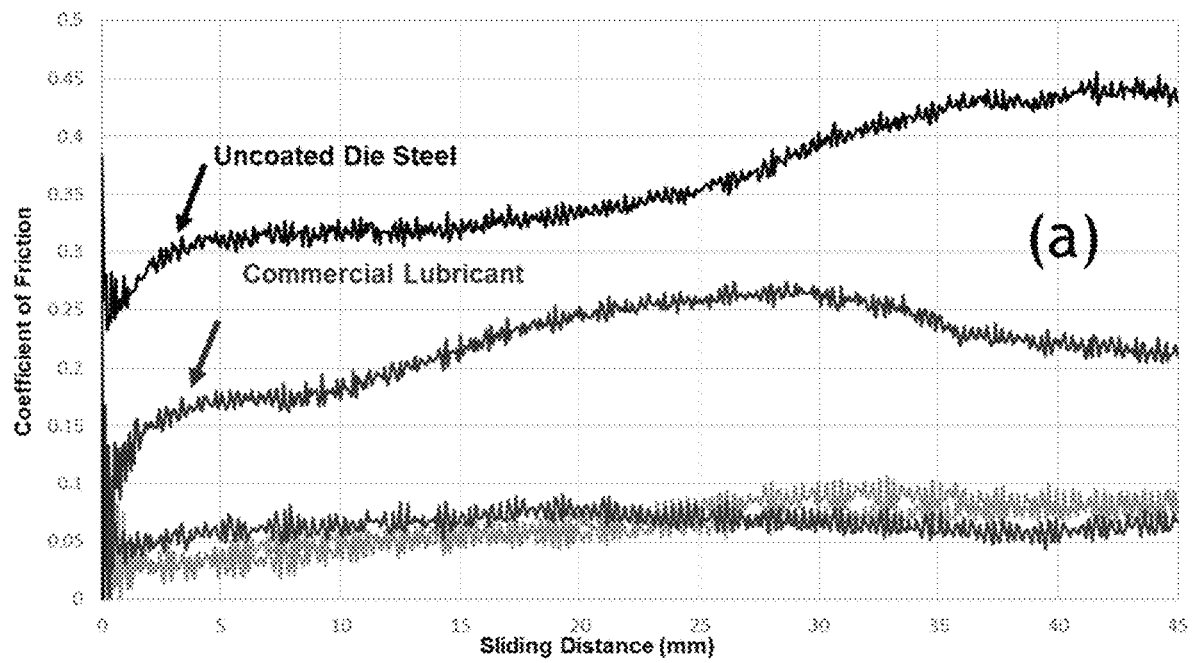
FIGS. 8A-8B show graphs for twist compression tests showing the longevity of the coatings graphene+PDA survived for 3 turns (FIG. 8A) and $MoS_2$+PDA survived for 3 turns (FIG. 8B).
Figure 8B:
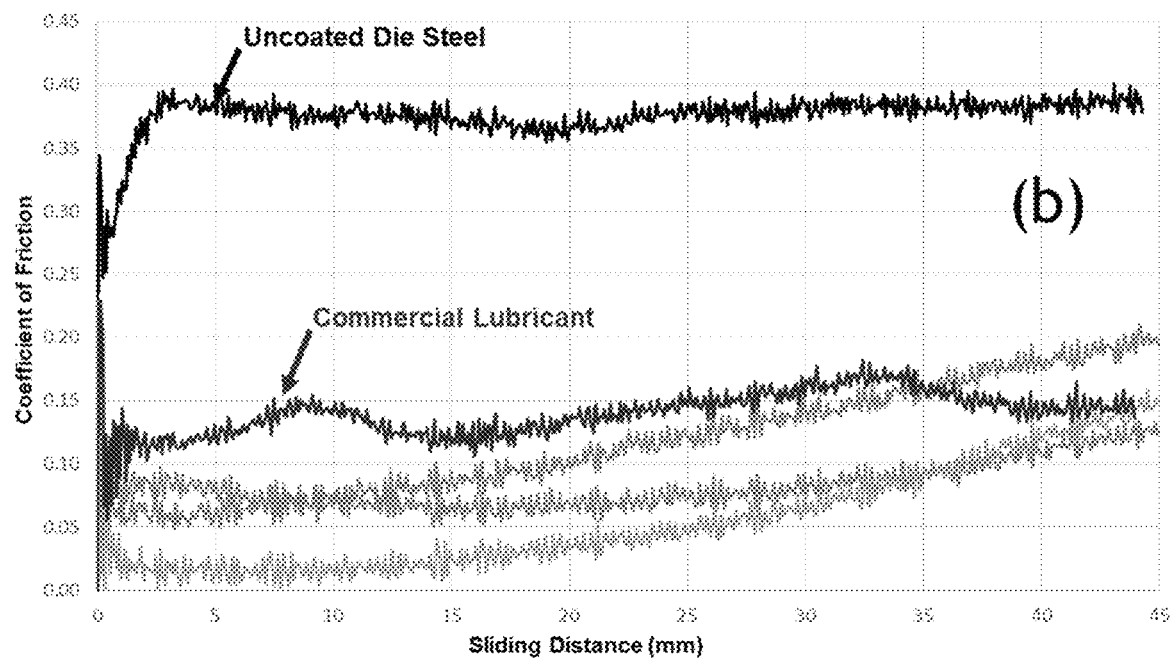

The longevity of the select lubricants were tested and the data is shown in FIGS. 8A and 8B. The cups with lubricant applied were rotated at the same location for multiple times until the friction reached to "bare" levels. The longevity tests revealed that the Graphene+PDA survived for 5 turns, whereas $MoS_2$+PDA survived for 3 turns.

Twist Compression Tests on Aluminum 7075 at 480° C.

Similarly, friction for warm forming at 480° C. was tested. FIG. 8 shows the actual friction measurements, including repeatability and longevity. The lubricant survived for three turns.

Twist Compression Tests on Boron Steel Usibor 1500 A-S at 790° C.

Figure 9:
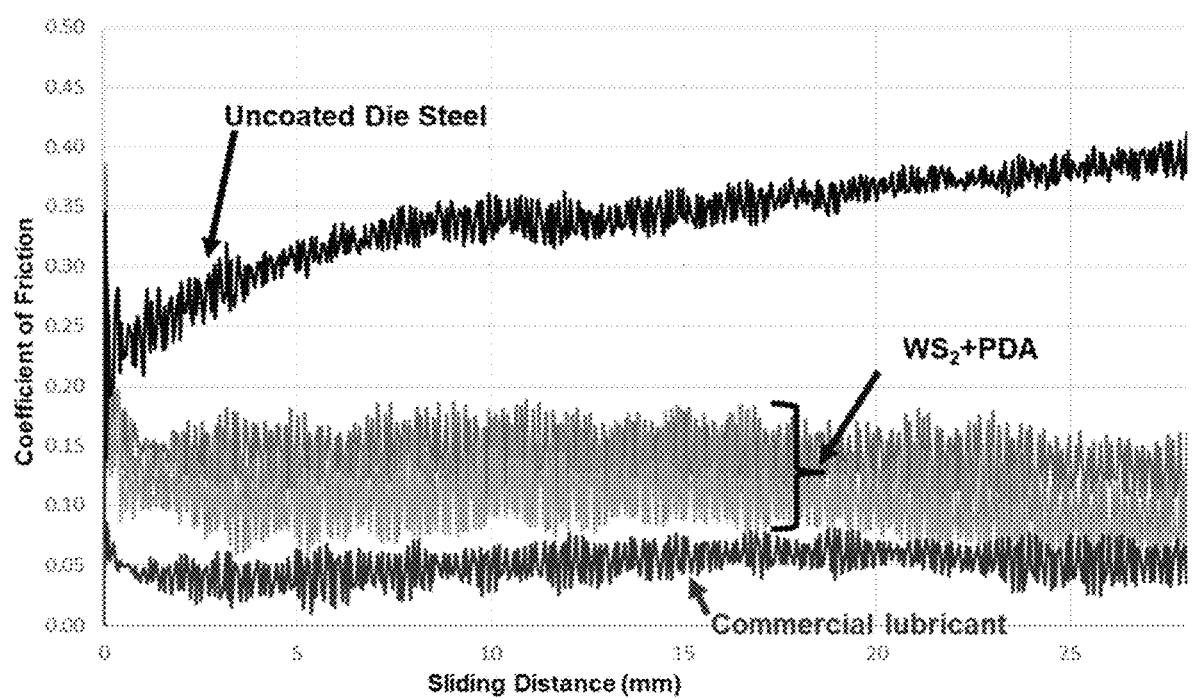
FIG. 9 shows a graph of friction recorded with twist compression testing at 790° C. $WS_2$+PDA showed lower friction compared to bare metal-on-metal contact.

Lubricants for twist compression of boron steel-die steel was evaluated at 790° C. with all aforementioned lubricants. Graphene+PDA was observed to perform better than uncoated steel substrates. It may be noted that no lubricants are currently being used for red-hot high temperature stamping applications and the developed lubricants reduce the friction from 0.2-0.15 with no interference on the steel as is the case with $WS_2$+PDA presented in FIG. 9.

Definitions.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The terms "substantially" and "about" used throughout this Specification are used to describe and account for small fluctuations. For example, they may refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method comprising:
preparing graphene-oxide by chemical exfoliation of polycrystalline graphite or highly-oriented pyrolytic graphite;
suspending the prepared graphene-oxide in a solvent to form a mixture of at least 50 mg/L;
adding at least 50 mg/L of boron nitride to the mixture;
adding a functionalizer comprising polydopamine ("PDA");
sonicating the mixture to form a homogenous mixture; and
disposing the homogeneous mixture by:
spraying the homogeneous mixture on a substrate via a process of air-spray coating, wherein the substrate has a temperature of at least 110° C.,
forming a wet film on the substrate, and
evaporating the solvent to form a dry coating layer, the dry coating layer reducing the friction of the substrate by greater than or equal to 50%.

2. The method of claim 1, wherein the graphene oxide and the boron nitride are in a range of ratios of about 1:1.

3. The method of claim 1, wherein the solvent is water.

4. The method of claim 1, wherein the solvent is oil-free.

5. The method of claim 1, wherein the substrate is boron steel.

6. The method of claim 1, wherein the temperature is about 275° C.

7. The method of claim 1, wherein the functionalizer is added prior to sonicating the mixture.

8. The method of claim 7, wherein the functionalizer further comprises Polyether ether ketone ("PEEK").

9. A method comprising:
preparing a functionalizer solution comprising polydopamine;
forming a solid lubricant mixture;
sonicating the solid lubricant mixture to form a homogenous mixture;
adding the functionalizer solution to the homogenous mixture, forming a liquid spray mixture; and
disposing the liquid spray mixture by:
spraying the liquid spray mixture on a substrate via a process of air-spray coating,
forming a wet film on the substrate, and
evaporating the solvent component to form a dry coating layer, the dry coating layer reducing the friction of the substrate by greater than or equal to 50%;
wherein the dry coating layer comprises polydopamine and the solid lubricant.

10. The method of claim 9, wherein preparing a functionalizer solution comprises:
mixing PDA powder with ethanol and water;
adjusting the pH to 8.3; and
polymerizing PDA.

11. The method of claim 10, wherein the polydopamine and solid lubricant are present in a substantially 1:1 ratio.

12. The method of claim 9, wherein the solid lubricant is selected from the group consisting of boron nitride and graphene oxide, nanodiamonds, molybdenum sulfide, graphene, and tungsten sulfide.

13. The method of claim 9, further comprising diluting the solid lubricant mixture with water.

14. The method of claim 9, wherein the substrate has a temperature at least about 110° C.

15. The method claim 9, wherein the substrate is boron steel.

16. The method claim 9, wherein the substrate is aluminum.

* * * * *